United States Patent [19]

Kalverkamp et al.

[11] Patent Number: 5,653,633

[45] Date of Patent: Aug. 5, 1997

[54] SCREEN CONVEYOR FOR ROOT CROP HARVESTER

[75] Inventors: Klemens Kalverkamp, Ahlen; Richard Tepe, Damme, both of Germany

[73] Assignee: Franz Grimme Landmaschinenfabrik GmbH & Co. KG, Damme, Germany

[21] Appl. No.: 506,507

[22] Filed: Jul. 25, 1995

[30] Foreign Application Priority Data

Sep. 1, 1994 [DE] Germany .................. 9414130 U

[51] Int. Cl.$^6$ ............................................... A01D 61/00
[52] U.S. Cl. ........................ 460/114; 460/144; 198/631.1
[58] Field of Search ............................. 460/114, 115, 460/144, 904; 56/14.5; 198/631.1, 842; 171/135

[56] References Cited

U.S. PATENT DOCUMENTS

| 33,061 | 8/1861 | Bronson | 198/631.1 X |
|---|---|---|---|
| 2,833,203 | 5/1958 | Benson et al. | 198/631.1 X |
| 4,174,718 | 11/1979 | van de Weerd | 460/114 |
| 5,480,352 | 1/1996 | Luscombe | 460/114 |

FOREIGN PATENT DOCUMENTS 4313320  10/1994  Germany ..................... 460/144

*Primary Examiner*—Terry Lee Melius
*Attorney, Agent, or Firm*—Jordan and Hamburg

[57] ABSTRACT

The screen conveyor for root crop harvesters comprises an endless screen belt conveyor, which consists of at least two conveyor belts and transverse conveying rods fastened to the conveyor belts and rotates about deflection rollers, which are rotatably mounted in a housing and of which at least one group can be driven by a driving mechanism by coaxially disposed deflection rollers. For this purpose, at least one adjuster is provided, which can be shifted into position against the working half of the screen conveyor belt and specifies a changing course for the working half of the conveyor belt by forming a step.

23 Claims, 3 Drawing Sheets

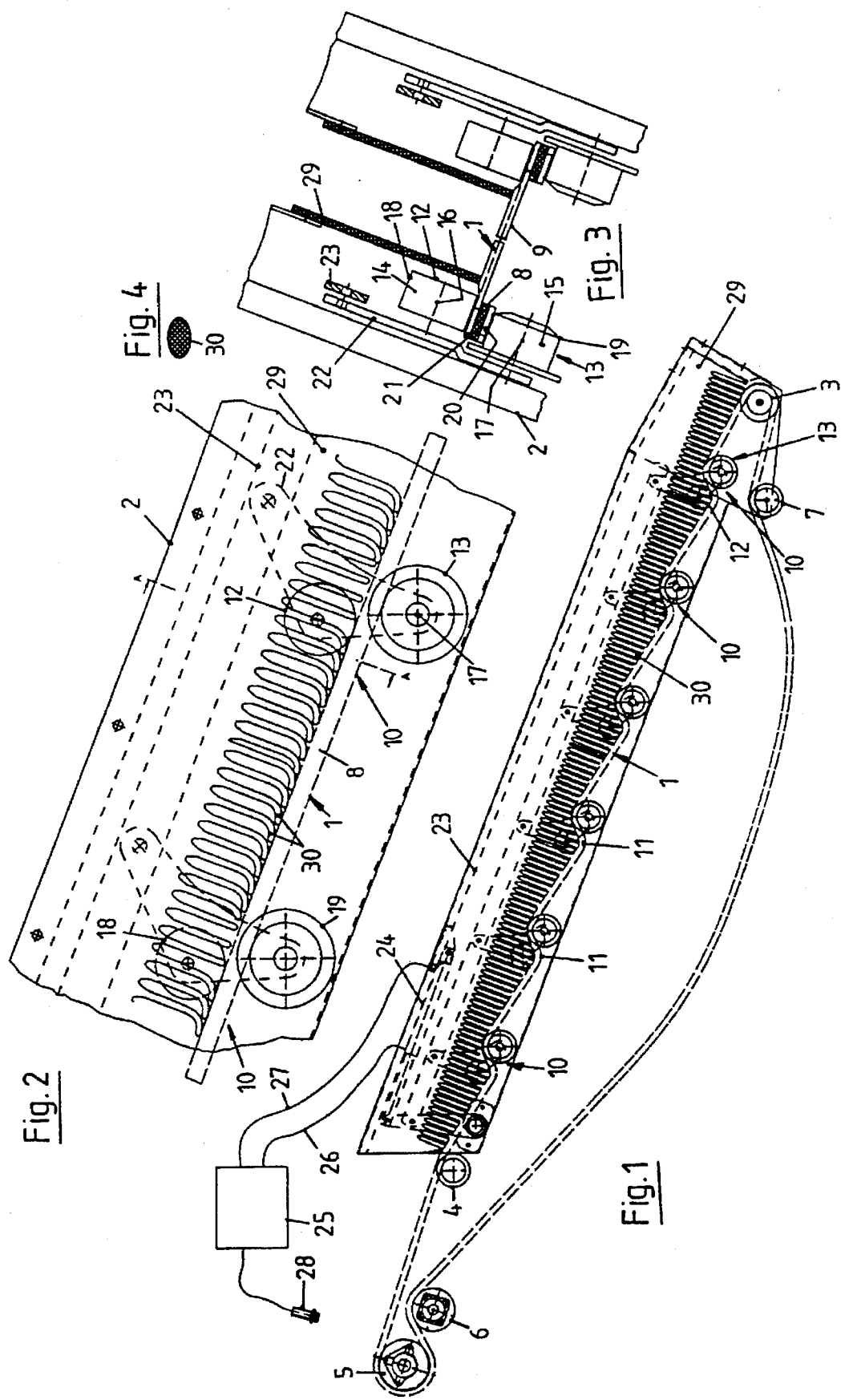

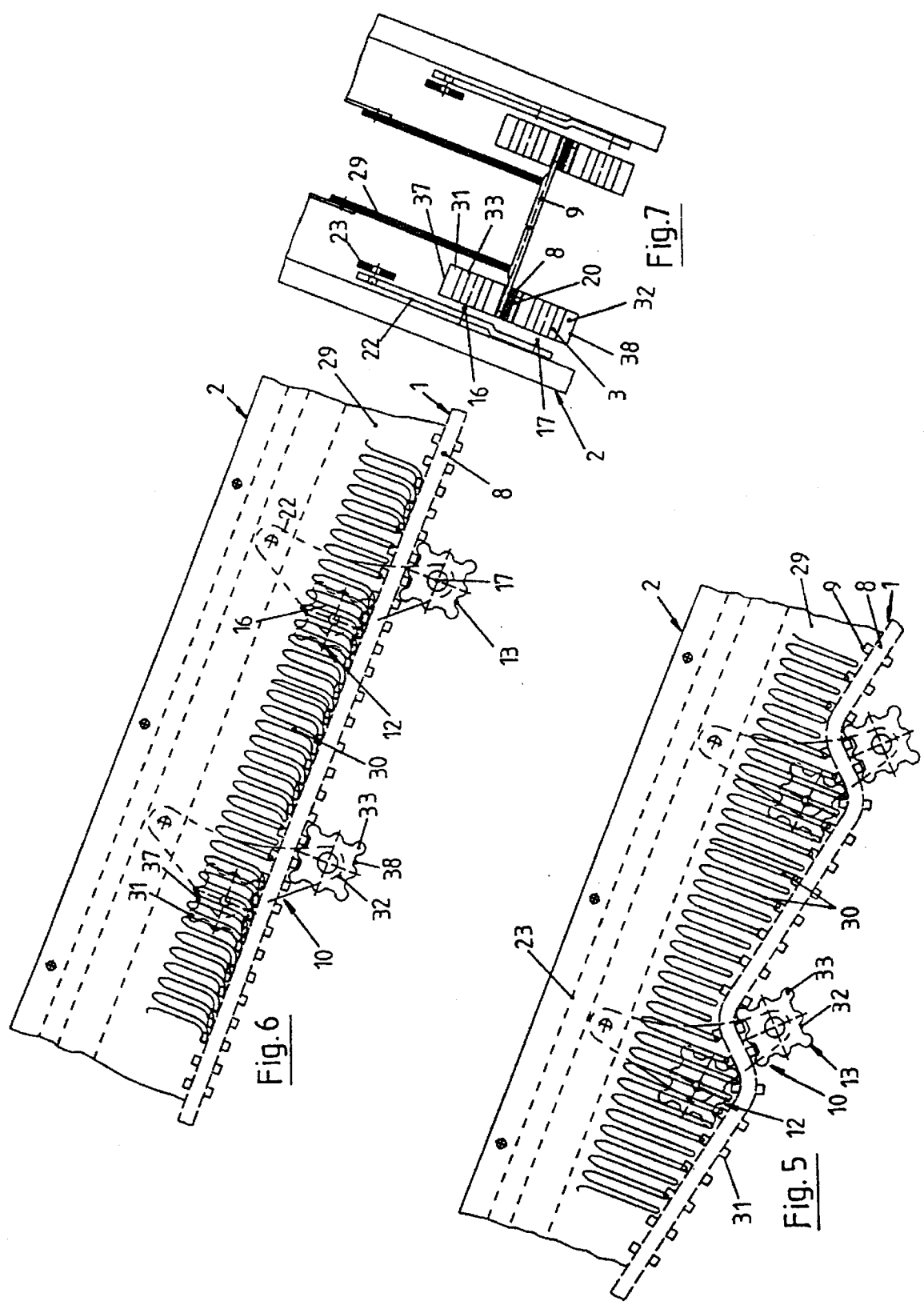

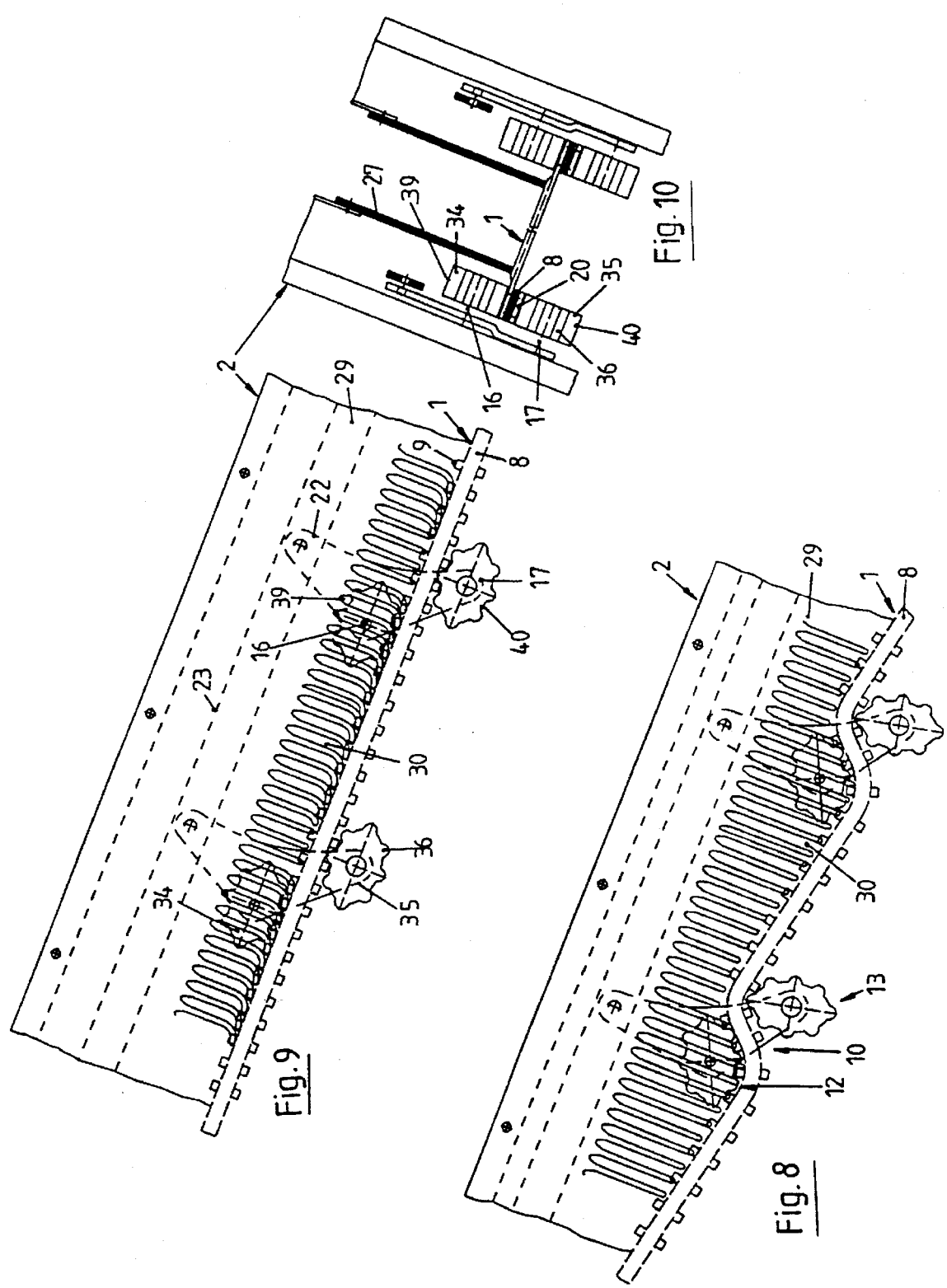

SCREEN CONVEYOR FOR ROOT CROP HARVESTER

BACKGROUND OF THE INVENTION

The invention relates to a screen conveyor for root crop harvesters.

It is known that the screening function of the screen conveyor belt can be improved by causing the working half of the screen conveyor belt to oscillate by means of an oscillating, tapping apparatus or by means of the conveyor driving mechanism and that the disintegration of the dam composite can be accelerated by the shaking action.

SUMMARY OF THE INVENTION

The invention is concerned with the problem of an intensification of the screening action of the screen belt conveyor, adapted to the particular soil conditions of the harvesting, the potatoes on the screen belt conveyor being treated particularly gently.

The inventive screen conveyor provides the possibility for developing falling steps, the height of which is adjustable and which spread out and subsequently bring together the dam containing the potatoes passing over the steps and, with that, produce a motion of the dam components relative to one another. This motion appreciably intensifies the removal of soil by screening. Additional relative motions arise out of the elimination of the parallelity of the course of the dam and the belt surface, which favors the removal by screening even more. By means of the infinitely variable adjustment of the step height between zero and the maximum value, the number of steps can be matched to the particular conditions, such matching being controlled and also regulated as a function of a fixed degree of screening.

Further details and advantages arise out of the following specification and the drawing, in which several embodiments of the object of the invention are shown in greater detail diagrammatically.

BRIEF DESCRIPTION OF THE DRAWINGS

FIG. 1 shows a diagrammatic side view of an inventive screen conveyor with a number of steps constructed in the working half of the screen conveyor belt, FIG. 2 shows a truncated, enlarged view, similar to that of FIG. 1, for illustrating the screen belt conveyor with the step-free course, FIG. 3 shows a truncated, diagrammatic section along the line A—A of FIG. 2, FIG. 4 shows a sectional representation of a finger of a guiding apron along the line B—B of FIG. 2, FIG. 5 shows a truncated side view similar to that of FIG. 2 in a second embodiment of the screen conveyor with the step-shaped course of the screen conveyor, FIG. 6 shows a view similar to that of FIG. 5 to illustrate the conveyor belt of the screen conveyor with the step-free course, FIG. 7 shows a section representation similar to that of FIG. 3 through the construction of FIG. 6, FIG. 8 shows a truncated side view similar to that of FIG. 5 of a third embodiment of a screen conveyor with a step-shaped course of the conveyor belt, FIG. 9 shows a view similar to that of FIG. 8 to illustrate the screen belt conveyor with a step-free course and FIG. 10 shows a sectional representation similar to that of FIGS. 3 and 7 through the embodiment of FIG. 9.

DESCRIPTION OF THE PREFERRED EMBODIMENTS

The screen conveyors for root crop harvesters shown in the drawing, particularly for potato harvesters and pick-up loaders have a conveyor belt 1, which revolves endlessly about deflection rollers 3, 4, 5, 6, 7 rotatably mounted in a housing 2, of which the deflection rollers 5, which are disposed coaxially, can be driven by a driving mechanism, the details of which are not shown. The driving mechanism can be formed by a hydraulic motor or derived from a tractor, for example, over drive shafts.

In detail, the screen belt conveyor 1 consists of two conveyor belts 8 disposed on the outside and of transverse conveying rods 9, which are disposed on these at equal distance from one another and parallel to one another and are riveted to the conveyor belts 8 in the region of ends that have been pressed flat. A number of adjusters 10, six in the example shown, are assigned to the working half of the screen belt conveyor 1. With the help of the adjusters 10, steps 11 can be formed in the course of the working half of the conveyor belt. The number of adjusters 10 depends on the length of the screen belt conveyor 1 and on the distance between the adjusters 10, which advisably ranges from 250 mm to 750 mm and preferably is equally large between all adjusters 10.

For adjustment purposes, each adjuster 10 comprises movable control elements 12, which can be adjusted infinitely variably or in steps between a starting position above the conveyor belts 8 that has no effect on the course of the working half of the screen conveyor belt 1 and an end position, in which they form a step of maximum height in the working half of the belt conveyor. These movable control elements 12 act in concert with stationary control elements 13, which in turn have an arrangement below the conveyor belts 8, in which they retain a step-free course for the working half of the screen belt conveyor 1 when the movable control elements 12 are in the starting position.

Preferably, the control elements 12, 13, are constructed as bodies of revolution, of which each adjuster 10 has two pairs, which act in concert with the upper side and the underside of the two conveyor belts 8. In the embodiment of FIGS. 1 to 3, the bodies of revolution 12, 13 are formed by cylindrical rollers 14, 15, which offer at their periphery an engagement surface 18, 19, which is rotationally symmetrical with their axis of rotation 16, 17. The engagement surface 18, 19 of the bodies of revolution 14, 15 can be formed cylindrically throughout or also have a basic cylindrical shape with profiling, which acts in concert with elevations on the upper side and the underside of the conveyor belts 8. The elevations on the upper side of the belt are formed by ends, pressed flat, of the transverse conveying rods 9 and the elevations on the underside of the belt can be formed by the flat pieces 20, which correspond to and lie opposite the ends, pressed flat, of the transverse conveying rods 9 and through which the connecting rivets 21 pass.

In the case of the engagement surfaces 18, 19 profiled to accommodate the elevations, the bodies of revolution 14, 15 are caused to revolve by the advancing screen conveyor belt, the main engagement, however, taking place between the cylindrical part of the engagement surfaces 18, 19 of the bodies of revolution 14, 15 and the surfaces of the conveyor belts 8. In the case of continuous, cylindrical engagement surfaces 18, 19, which engage only elevations on the conveyor belts 8, the engagement surfaces 18, 19 advisably are formed at a noise-damping and impact-damping peripheral layer, which may consist, for example, of rubber.

In the case of the embodiments shown, the control elements 12 are mounted at a rectangular lever 22, which can be swiveled about the axis of rotation 17 of the associated second control element 13 of a control element pair assigned to a conveyor belt 8 and receives its swiveling drive from a control rod 23, which can be operated by a pressure medium cylinder 24. This pressure medium cylinder 24 can be acted upon by a controller 25 over the pressure medium pipelines 26, 27. The controller receives its control input from a measuring instrument 28, such as an infrared sensor or a photoelectric barrier, with which the degree of screening is determined near the discharging end of the screen belt conveyor 1.

With the help of the control rods 23, one each of which is assigned to the pair of control elements 12, 13 assigned in each case to a conveyor belt 8, the control elements 12 can be deviated on an arc of a circle about the axis 17 of the control elements 13 out of their starting position illustrated in FIGS. 2, 6 and 9 into an end position, in which they act in concert with the control elements 13 to form the steps 11, as illustrated in FIGS. 1, 5 and 8 with, in each case, the maximum step height.

In the example shown, all movable control elements 12 are operated jointly and uniformly with the consequence that steps of the same depth are formed in the screen belt conveyor 1. Instead of this particularly simple form of operating the control elements and forming the steps, it is also possible and advantageous in particular cases to operate the movable control elements 12 of an adjuster 10 independently of the control elements 12 of other adjusters 10. With such individual operation or by operating the movable control elements 12 simultaneously in groups, it is possible to construct steps 11 of independently selectable height in the screen belt conveyor 1, for example, advantageously in the manner that the steps 11, formed in the working half of the screen conveyor belt 1, have a decreasing height in the running direction of the working half of the conveyor belt. Furthermore, it is possible to decrease the number of steps, if necessary, below the number of adjusters 10, if the soil conditions, for example, from the very start ensure good screening and an intensification of the screening to the fullest extent possible is not desired. The different possibilities for controlling or regulating step formation in the screen belt conveyor 1 can be assigned to programs and these can optionally be included in the regulating system under the control of a computer. The primary control input for such regulating process is the degree of screening, which should reach its maximum only shortly before the upper end of the working half of the screen conveyor belt, so that the potatoes, remaining behind on the screen belt conveyor 1, do not remain unprotected on the latter for longer distances after the screening has been completed.

For shielding the adjusters 10 from contact with the components of a potato dam transferred to the working half of the screen conveyor belt 1, lateral, supported guiding aprons 29, which run parallel to the running direction of the working half of the screen conveyor belt and are aligned essentially at right angles to its surface, are provided at the housing 2. The lower border edge of the guiding apron 29 in each case is impenetrable on the inside, next to the conveyor belts 8. When the course of the working half of the conveyor belt is step-free, the lower edge region of the guiding aprons 29 can lie on the upper side of the working half of the screen conveyor belt or end impenetrably above the working half of the screen conveyor belt 1. In any case, the lower part of the guiding aprons 29 is elastically deformable and adaptable to the course of the working half of the screen conveyor belt 1, when the latter is constructed in these steps 11.

Preferably, the lower part of the guiding aprons 29 is formed by elastically flexible guiding fingers 30 disposed impenetrably in parallel behind one another in the running direction of the working half of the screen conveyor belt 1. Said guiding fingers 30 experience an intensified elastic deviation during the formation of the steps.

Because the ends of the guiding fingers slide over the transverse conveying rods 9 of the screen belt conveyor 1, said rods 9 experience a back and forth motion in and counter to the running direction of the working half of the conveyor belt, so that they bring about active shielding. The guiding fingers 30 can all have the same length (FIGS. 2, 6 and 9), in which case they lie on the undeformed working half of the conveyor belt with uniform deformation of their lower ends. However, they can also have a stepped length to correspond to the intended maximum step formation, in which case, when the steps have the maximum height, they are in engagement with the working half of the screen belt conveyor 1 with uniformly deformed lower ends and, when the working half of the conveyor belt has no steps, experience greater or lesser deformations in zones. The guiding fingers 30 can be circular or also oval in cross section, as shown in FIG. 4. Such guiding aprons can also be used for screen conveyors, in which steps are not formed in the conveyor belt.

The constructions of FIGS. 5 to 7 on the one hand and of FIGS. 8 to 10 on the other differ from the construction of the screen conveyor of FIGS. 1 to 4 only due to the different configuration of the control elements 12, 13. In the constructions of FIGS. 5 to 7, these are formed by bodies of revolution 31, 32, which basically have a square shape and elevations 33 molded at the periphery. In the construction of FIGS. 8 to 10, they are formed by bodies of revolution 34, 35, which basically have an approximately elliptical shape and elevations 36 molded at the periphery.

The bodies of revolution 31, 32 of the construction of the screen conveyor of FIGS. 5 to 7 have an engagement surface 37, 38 at the periphery, which basically offers a square shape, but on which elevations 33 are superimposed, of which one each is provided in the four corners and a further one between the corner elevations.

The bodies of revolution 34, 35 of the screen conveyor of FIGS. 8 to 10 have an engagement surface 39, 40 at the periphery, which basically offers an elliptical shape and on which elevations 36 are also superimposed. One each of the elevations is disposed here in an aligned extension of the long or short axis of the ellipse and a further elevation is provided between these.

The elevations 33 and 36 provide the engagement surfaces 37, 38 and 39, 40 respectively of the bodies of revolution 31, 32 and 34, 35 respectively with a profiling, by means of which they act in concert, in a driving sense, with the elevations on the upper side and the underside of the conveyor belts 8. The bodies of rotation 31, 32; 34, 35 of the pair of bodies or rotation, acting in concert with a conveyor belt 8 of the screen belt conveyor 1, are aligned with respect to one another in such a manner, that the engagement surfaces 37, 38 and 39, 40 respectively in each case act on the conveyor belts 8 simultaneously with their regions with a maximum axial distance and subsequently correspondingly in each case simultaneously with regions with a minimum axial distance. At the same time, they are revolving synchronously.

The pairs of asymmetric bodies of revolution 31, 32 and 34, 35 respectively, which act in concert, are disposed in their starting position of FIGS. 6 and 9, in which they permit the working half of the screen conveyor belt 1 to have a step-free course, so that their engagement surfaces 37, 38 and 39, 40 respectively are in engagement with the upper side and the underside respectively of the conveyor belts 8 and revolve synchronously. As a result, flat steps are formed temporarily in the screen belt conveyor 1 whenever the regions of the engagement surfaces 37, 38 and 39, 40 respectively engage the conveyor belts 8 with a maximum axial distance. On the other hand, in between times, when the regions of the engagement surfaces 37, 38 and 39, 40 respectively act on the conveyor belts 8 with a minimum axial distance, the working half of the screen conveyor belt 1 once again assumes its step-free course.

Since the bodies or rotation 31, 32 have four regions of engagement surfaces 37, 38 with a maximum axial distance, the working half of the screen conveyor belt 1 experiences four step formations during its advance during each full revolution of the bodies of rotation 31, 32. Due to this rapid, consecutive formation of flat steps, the working half of the screen conveyor belt 1 is set, as it were, into pulsating oscillations and exerts shaking motions in conjunction with changes in the course of the surface on the upper side of the potato dam. The screening action is favored appreciably by these shaking motions.

The screening action is intensified even significantly more, if the control elements 12, 13 bring about a permanent formation of steps, as shown in FIGS. 5 and 8 with, by way of example, a maximum step depth. In addition to the forces, which intensify the screening action and which are transferred to the potato dam by the steps formed and by the asymmetry of the bodies of rotation 31, 32 and 34, 35 respectively, further forces, increasing the screening effect, are exerted on the potato dam owing to the fact that the regions of the working half of the conveyor belt between two consecutive adjusters 10 with asymmetric bodies of rotation experience accelerations and decelerations in and counter to the running direction of the working half of the screen conveyor belt 1 and agreeing in frequency with the changes in the engagement with regions of the engagement surfaces 37, 38; 39, 40 with a maximum distance and with regions with a minimum axial distance.

In the case of bodies of rotation 31, 32 with basically a square shape, the frequency of the step shape-intensifying and step shape-attenuating deformations is twice as high as in the case of bodies of rotation 34, 35. On the other hand, in the case of the elliptical or oval bodies of rotation 34, 35, the deformation amplitude can be made more pronounced in relation to the total dimensions of the bodies of rotation 34, 35.

Instead of a constant engagement of the profiled pairs of bodies of rotation 31, 32 and 34, 35 respectively with the conveyor belts 8, provisions can also be made that these, in the starting position for a step-free course of the working half of the screen conveyor belt 1, are disengaged from the elevations on the conveyor belt 8 and engage the conveyor belts 8 only when permanent steps are formed. Constructively, this can be realized, for example, owing to the fact that the rectangular lever 22 additionally can be pivoted clockwise about a swivel pin, which is placed centrally between the axes of rotation 16 and 17, beyond the position in FIG. 6 and 9, until the two bodies of rotation 31, 32 and 34, 35 respectively are raised from the conveyor belts 8. In the case of such a construction, the lower body of rotation 32, 35 is to be mounted at the lower end of the angle rectangular lever 22 and in a bearing of the housing 2, the bearing in the housing 2 being guided in an arc-shaped slot restricted about the central swivel pin of the rectangular lever 22. For the central swivel pin of the rectangular lever, the mounting must be pivotable about the axis of rotation 17 of the bodies of rotation 32, 35 in a limited fashion in an arc-shaped slot, the ends of the slot, as stops, in each case defining the pivoting ranges.

A synchronizing gear can be assigned to each pair of bodies of rotation acting in concert, in order to ensure synchronous running when the engagement between the bodies of rotation 31, 32 and 34, 35 respectively and the conveyor belts 8 is terminated completely.

We claim:
1. A screen conveyor for root crop harvesters comprising:
    a housing;
    a plurality of rollers rotatably mounted on said housing;
    an endless screen conveyor means driven and guided by said rollers, said screen conveyor means comprising two conveyor belts carrying spaced transverse carrying rods;
    said screen conveyor means having one working path on which said root crop in disposed which is a generally linear path and another working path on which said root crop is disposed which is a non-linear working path, said screen conveyor means moving over said one and said other working paths in a working direction, said non-linear working path having a step with an initial descending path portion followed by an ascending path portion considered in said working direction of movement of said screen conveyor means; and
    adjuster means engageable with said screen conveyor means to change said screen conveyor means from said one working path to said other working path.

2. A screen conveyor according to claim 1 further comprising control means operable to adjust said adjuster means dependent on the effectiveness of the screening of said root crop by said screen conveyor means.

3. A screen conveyor for root crop harvesters comprising:
    a housing;
    a plurality of rollers rotatably mounted on said housing;
    an endless screen conveyor means driven and guided by said rollers, said screen conveyor means comprising two conveyor belts carrying spaced transverse carrying rods;
    said screen conveyor means having one working path on which said root crop is disposed which is a generally linear path and another working path on which said root crop is disposed which is a non-linear working path having a plurality of steps each having a descending path portion and an ascending path portion;
    adjuster means engageable with said screen conveyor means to deviate said working path of said screen conveyor means;
    said adjuster means being engageable with said screen conveyor means to change said screen conveyor means from said one working path to said other working path;
    said adjuster means comprising a plurality of adjuster sub-assemblies each engageable with said screen conveyor means to deviate said working path of said screen conveyor means, each of said adjuster sub-assemblies being operable to form one of said steps in said screen conveyor means.

4. A screen conveyor according to claim 3 wherein said adjuster means comprises control means operable to adjust said plurality of adjuster sub-assemblies so that each of said adjuster sub-assemblies forms a step of substantially the same height.

5. A screen conveyor according to claim 3 wherein said adjuster means comprises control means operable to adjust said plurality of adjuster sub-assemblies so that said adjuster sub-assemblies form steps of decreasing height in the moving direction of said working path of said screen conveyor means.

6. A screen conveyor according to claim 3 wherein said adjuster means comprises control means operable to adjust said plurality of adjuster sub-assemblies dependent on the effectiveness of the screening of said root crop by said screen conveyor means.

7. A screen conveyor for root crop harvesters comprising:
a housing;
a plurality of rollers rotatably mounted on said housing;
an endless screen conveyor means driven and guided by said rollers, said screen conveyor means comprising two conveyor belts carrying spaced transverse carrying rods;
said screen conveyor means having a working path on which said root crop is disposed; and
adjuster means engageable with said screen conveyor means to deviate said working path of said screen conveyor means, said adjuster means comprising a plurality of spaced adjuster sub-assemblies each engageable with said screen conveyor means to deviate said working path of said screen conveyor means.

8. A screen conveyor according to claim 7 wherein said plurality of adjuster sub-assemblies are spaced substantially equal from one another along said working path.

9. A screen conveyor according to claim 7 wherein said adjuster means comprises control means for controlling each of said plurality of adjuster sub-assemblies individually, jointly and in groups independently of one another.

10. A screen conveyor for root crop harvesters comprising:
a housing;
a plurality of rollers rotatably mounted on said housing;
an endless screen conveyor means driven and guided by said rollers, said screen conveyor means comprising two conveyor belts carrying spaced transverse carrying rods;
said screen conveyor means having a working path on which said root crop is disposed; and
adjuster means engageable with said screen conveyor means to deviate said working path of said screen conveyor means, said adjuster means comprising rotatable bodies which are operable in pairs with one rotatable body being engageable with the underside of said screen conveyor means and the other rotatable body of said pair of rotatable bodies being engageable with the upper side of said screen conveyor means.

11. A green conveyor according to claim 10 further comprising rotatable support means for rotatably supporting said one rotatable body on said housing means for rotation about a first axis, said adjuster means further comprising lever mounted for rotation about said first axis, said other rotatable body being mounted on said lever for rotation about a second axis spaced from said first axis, said lever being pivotable about said first axis from one position to another position to thereby change the position of said other rotatable body relative to mid working path to thereby deviate said working path.

12. A screen conveyor according to, claim 10 wherein each of said rotatable bodies has a peripheral engagement surface which is symmetrical with the axis of rotation of the respective rotatable body.

13. A screen conveyor according to claim 10 wherein each of said rotatable bodies has a peripheral engagement surface which is asymmetrical with the axis of rotation of the respective rotatable body.

14. A screen conveyor according to claim 10 wherein each of said rotatable bodies has a generally quadrilateral configuration.

15. A screen conveyor according to claim 10 wherein each of said rotatable bodies has a generally elliptical configuration.

16. A screen conveyor according to claim 10 wherein said underside and said upper side of said screen conveyor means have first spaced projection means, said rotatable bodies having second spaced projection means engaging said first spaced projection means to provide a positive driving relationship between said screen conveyor means and said rotatable bodies.

17. A screen conveyor according to claim 16 wherein said rotatable bodies each have a generally square configuration formed by four corners and four sides, said second spaced projection projecting outwardly from said four corners and said four sides.

18. A screen conveyor according to claim 16 wherein said rotatable bodies each have a generally elliptical configuration formed by an elliptical surface, said second projection projecting outwardly from said elliptical surface.

19. A screen conveyor according to claim 10 wherein each of said rotatable bodies has a peripheral surface having a non-uniform diameter including a maximum diameter stud a minimum diameter, said peripheral, surface having a first portion juxtaposed to when said maximum diameter intersects said peripheral surface, said peripheral surface having a second portion juxtaposed to where said smallest diameter intersects said peripheral surface, said one and said other rotatable bodies being disposed such that said first portion of said one rotatable body engages said underside of said screen conveyor means when said second portion of said other rotatable body engages said upper side of said screen conveyor means and said second portion of said one rotatable body engages said underside of said screen conveyor means when said first portion of said other rotatable body engages said upper side of said screen conveyor means such that synchronous rotation of said first and second rotatable bodies effects repeated deviation and oscillation of said working path of said screen conveyor means.

20. A screen conveyor for root crop harvesters comprising:
a housing;
a plurality of rollers rotatably mounted on said housing;
an endless screen conveyor means driven and guided by said rollers, said screen conveyor means comprising two conveyor belts carrying spaced transverse carrying rods;
said screen conveyor means having a working path on which said root crop is disposed; and
adjuster means engageable with said screen conveyor means to deviate said working path of said screen conveyor means; and
apron means disposed on said housing, said screen conveyor means moving in a working direction along said working path, said apron means extending in a direction parallel to said working direction, said screen conveyor means having a working surface at said working path, said apron means overlying said working surface and being generally perpendicular to said working surface, said apron means having a flexible lower part which is flexible to conform to the deviation of said working path.

21. A screen conveyor according to claim 20 wherein said flexible lower part of said apron means comprises a plurality of flexible guiding fingers which are disposed in aligned array parallel to said working direction.

22. A screen conveyor for root crop comprising:

a housing;

a plurality of rollers rotatably mounted on said housing;

an endless rollers, said screen conveyor and guided by said rollers, said screen conveyor means comprising two conveyor belts carrying spaced transverse carrying rods;

said screen conveyor means having a first working path on which said root crop is disposed which is a generally linear path;

adjuster means engageable with said screen conveyor means to change said screen conveyor means from said first working path to second working path on which said root crop is disposed, said second working path being a non-linear working path, said screen conveyor means moving over said first or said second working paths in a working direction, said second non-linear working path having a step with an initial path portion which is descending relative to the first working path and a following path portion considered in said working direction of movement of said screen conveyor means which is ascending relative to the first working path.

23. A screen conveyor for root crop harvesters comprising:

a housing;

a plurality of rollers rotatably mounted on said housing;

an endless screen conveyor means driven and guided by said rollers, said screen conveyor means comprising two conveyor belts carrying spaced transverse carrying rods;

said screen conveyor means having a first working path on which said root crop is disposed which is a generally linear path;

adjuster means engageable with said screen conveyor means to change said screen conveyor means from said first working path to a second working path on which root crop is disposed, said second working path being a non-linear working path, said screen conveyor means moving over said first or said second working paths in a working direction, said second non-linear working path having a step with an initial path portion which is descending relative to the first working path and a following path portion considered in said working direction of movement of said screen conveyor means which is ascending relative to the first working path;

said adjuster means comprising a plurality of adjuster sub-assemblies each engageable with said screen conveyor means to deviate said working path of said screen conveyor means, each of said adjuster sub-assemblies being operable to form one of said steps in said screen conveyor means.

* * * * *